United States Patent [19]
Ormond

[11] 3,788,130
[45] Jan. 29, 1974

[54] LOW INTERACTION MULTI LOAD CELL SYSTEM FOR MEASURING THRUST

[76] Inventor: Alfred Newman Ormond, 11969 Riveria Rd., Sante Fe Springs, Calif.

[22] Filed: Oct. 18, 1972

[21] Appl. No.: 298,480

[52] U.S. Cl. .......................................... 73/117.4
[51] Int. Cl. ........................................ G01l 5/13
[58] Field of Search 73/117.4, 141 R, 141 A, 141 AB

[56] References Cited
UNITED STATES PATENTS

| | | | |
|---|---|---|---|
| 3,284,749 | 11/1966 | Fouretier | 73/141 A X |
| 3,621,927 | 11/1971 | Ormond | 177/211 |

Primary Examiner—Jerry W. Myracle
Attorney, Agent, or Firm—Ralph B. Pastoria; Pastoriza & Kelly

[57] ABSTRACT

A plurality of vertically disposed load cells are positioned between a rigid plate and a platform riding on top of the load cells. A rocket engine whose thrust is to be measured has its nose coupled to the center point of the platform by a universal flexure and extends vertically above the platform. Additional load cells connect between a rigid structure and peripheral portions of the rocket for measuring side and roll forces. The plurality of load cells beneath the platform have end surfaces of convex configuration the radius of curvature of each which is preferably less than one-half the distance between the two bearing surfaces; that is, less than one-half the distance between the end engaging surfaces of the load cell. A negative coefficient of restitution to horizontal forces on the platform is thereby generated which effectively cancels the positive coefficient of restitution present when large forces are vertically applied to the platform.

This invention relates generally to load cell measuring techniques and more particularly to an improved low interaction multi load cell system for measuring thrust forces as might be generated by large solid propellant rocket engines.

4 Claims, 7 Drawing Figures

PATENTED JAN 29 1974 3,788,130

LOW INTERACTION MULTI LOAD CELL SYSTEM FOR MEASURING THRUST

BACKGROUND OF THE INVENTION

Because of the enormous size of certain types of rocket engines and the magnitude of thrust force generated by such engines, it is very difficult to suspend the engine on a conventional multi component force measuring system without going to extreme expense. In any such measurements, it is very desirable to cancel interacting forces which might interfere with an accurate measurement of a principal vector force such as the thrust. Heretofore, excellent isolation has been provided by flexures mounted on both ends of each load cell used for measurements along with a central universal flexure through which thrust forces are transmitted. However, as the force increases and the size of the rocket or vehicle grows, the structure required to support the larger forces increases proportionally and it becomes increasingly difficult to design a structure to load two of the thrust force measuring load cells in tension and two in compression. To make a workable system for large thrust forces by conventional means results, as noted, in high expense, high revetment, and additional time for thrust measurements, testing, and data reduction.

BRIEF DESCRIPTION OF THE PRESENT INVENTION

With the foregoing in mind, the present invention contemplates a unique approach for measuring large thrust forces which minimizes expense and still provides a system that decreases the interaction force terms associated with measuring the vector components of a large thrust force.

Essentially, rather than using load cells in tension and compression to cancel interactions, the present invention utilizes load cells manufactured around the principle of a large ball. In accord with the method of the invention, interacting forces when measuring large vertical forces are substantially reduced by providing lower and upper spaced parallel bearing surfaces. A load cell is positioned between the surfaces with its load sensitive axis normal to the surfaces. The end engaging surfaces of the load cell itself are of convex configuration, each being formed with a radius of curvature no greater than one-half and usually greater than one-fourth the distance between the parallel bearing surfaces when the cell is vertically disposed between the same with its end surfaces in contact with the bearing surfaces. Preferably a plurality of such load cells are provided and thus simulate the condition of a number of ball bearings between the two surfaces which offer very low resistance to horizontal movement and yet will sustain a large thrust force. When the end surfaces are contoured with a reduced radius of curvature, that is less than one-half the diameter of a corresponding ball bearing, there is generated a negative coefficient of restitution of horizontal movement of the upper platform surface supporting the rocket engine relative to the lower rigid flat bearing surface which effectively cancels the positive coefficient of restitution resulting from deformation of the bearing surfaces by the end surfaces of the load cells when subjected to the high downward thrust force on the platform.

The apparatus for carrying out the method comprises a rigid plate defining on its top a flat lower bearing surface cooperating with a platform defining on its bottom an upper flat bearing surface, the plurality of load cells being disposed between the opposed surfaces. A universal flexure in turn is disposed at the center of the platform for connection to the nose of the rocket engine to be tested and additional load cell means are provided for connection to the platform and engine for enabling measurements of side and roll forces generated by the engine to be computed.

BRIEF DESCRIPTION OF THE DRAWINGS

A better understanding of the invention will be had by referring to the accompanying drawings in which.

DETAILED DESCRIPTION OF THE INVENTION

Figure 1:
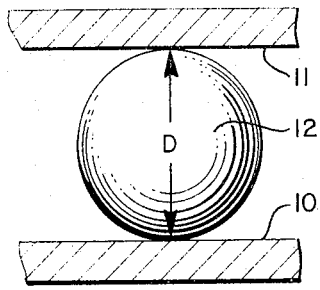
FIG. 1 is a fragmentary elevational view partly in cross-section of a ball bearing disposed between opposed bearing surfaces.

Referring first to FIG. 1, the basic principle on which the load cell design used in the present invention is based will be described. In FIG. 1 there is shown a rigid plate defining on its top a flat horizontal lower bearing surface 10 and a free floating platform defining on its underside a flat horizontal upper bearing surface 11. A ball bearing 12 of diameter D is shown holding the surfaces 10 and 11 separated such that the upper platform surface 11 can roll horizontally relative to the lower surface 10. For fairly light loads on the platform 11, there is very little friction to horizontal movement of the platform, the ball bearing 12 and any additional bearings between the surfaces exhibiting very little friction.

Figure 2:
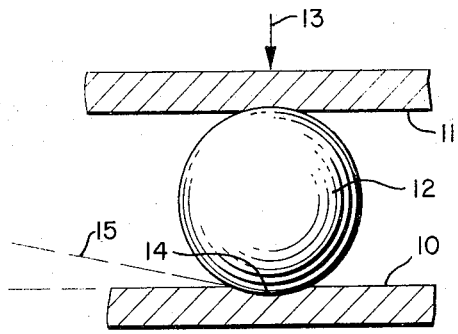
FIG. 2 is similar to FIG. 1 illustrating in exaggerated form physical deformations that occur under a high load tending to move one bearing surface towards the other.

Referring now to FIG. 2, if an exceedingly large force is applied to the platform in a generally vertical direction as indicated by the arrow 13, the contacting or engaging surfaces of the ball 12 with the opposed bearing surfaces 10 and 11 will tend to deform the opposed bearing surfaces causing a more or less permanent set as indicated by the concave depression 14 in the bearing surface 10. This deformation is shown in highly exaggerated form in FIG. 2 but will result in a slope as indicated by the dashed line 15 which in turn results in a tendency for the table or platform to return to its initial position after slight horizontal movement occurs. In otherwords, there is a positive coefficient of restitution to horizontal movement which tends to maintain the platform in a fixed position relative to the rigid lower surface 10. Accordingly, under a very large load, there will result a horizontal reaction force to horizontal movement.

Figure 3:
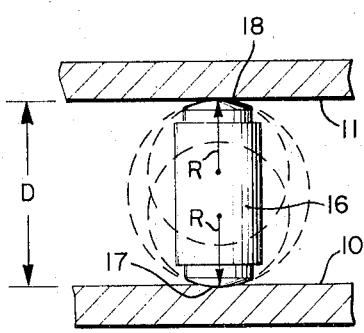
FIG. 3 illustrates a load cell designed in accord with the present invention positioned between opposed bearing surfaces in place of the ball bearing of FIGS. 1 and 2.

Referring now to FIG. 3, to measure large thrust forces as applied to the upper platform 11, a load cell 16 having its load sensitive axis vertical or normal to the bearing surfaces 10 and 11 is positioned between these surfaces. To minimize interactions for horizontal movements, the end engaging surfaces of the load cell 16 indicated at 17 and 18 are of a convex configuration having a given radius of curvature. For relatively light loads, this radius of curvature may be the same as that for the ball bearing 12 described in FIG. 1 and there would result a configuration analogous to a ball bearing which offers little resistance to movement. However, for heavy loads, a positive coefficient of restitution would result which would be undesirable as described in conjunction with FIG. 2.

In accord with a preferred embodiment of the present invention, for high thrust forces, the radius of curvature of each convex surface is made less than one-half and usually greater than one-fourth the diameter of a corresponding ball bearing positioned between the bearing surfaces. Since the distance between the engaging end surfaces 17 and 18 of the load cell corresponds to the distance between the bearing surfaces 10 and 11, this radius of curvature would be less than one-half such distance.

By fashioning the end engaging surfaces of the load cell in the above manner, a negative coefficient of restitution can be generated which effectively cancels the positive coefficient of restitution to horizontal movement of the platform. This generation of a negative coefficient of restitution can best be understood by considering the fact that a tendency for the table to move in a horizontal direction would result in a rolling action normally corresponding to that of the ball bearing but because of the shorter radius of curvature of the engaging end portion of the load cell even though the end surfaces are spaced apart the diameter of a corresponding ball, there will be a tendency to overbalance; that is, in the absence of a load, the platform would have a tendency to move horizontally, the same rolling on the decreased radius of curvature of the end surfaces of the load cell. However, under a very high loading applied to the platform, this overbalancing or unstable condition which results from a negative coefficient of restitution would be effectively canceled by the positive coefficient of restitution resulting from such large thrust as described in FIG. 2. By accurate adjustment of the radius of curvature, complete cancellation can be effected so that there is substantially no coefficient of restitution to horizontal movement of the platform under a large thrust force.

In FIG. 3 the dashed smaller circles represent spheres of radius R a portion of the surface of which constitutes the convex end configurations for the cell. The larger dashed circle represents the sphere that would be defined if the ball bearing 12 were substituted for the load cell. Thus the radius R is preferably between one-half and one-fourth D.

Figure 4:
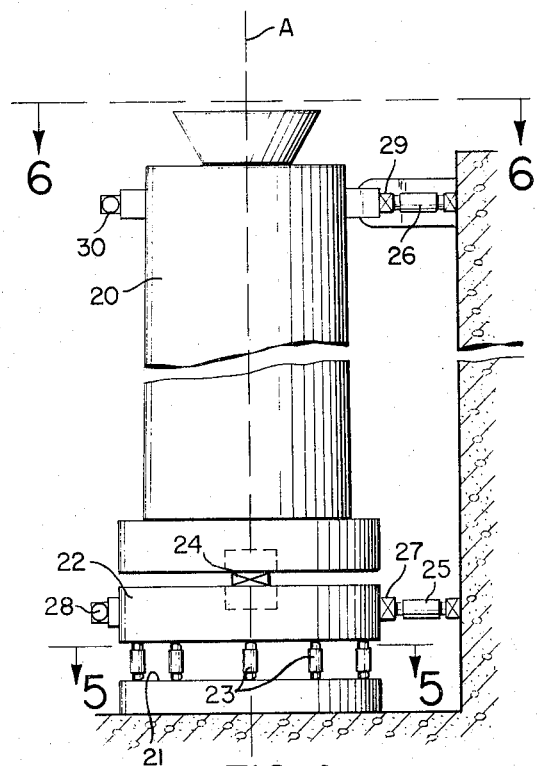
FIG. 4 is a side elevational view of a low interaction multi-load cell system for measuring thrust of a rocket engine in accord with the invention.

Referring now to FIG. 4, there is shown at 20 a large solid propellant rocket engine the thrust of which is to be measured in accord with the system of the present invention. As shown, there is provided a base rigid plate defining a flat horizontal lower bearing surface 21 cooperating with a platform 22 defining on its underside an upper bearing surface between which a plurality of load cells 23 are positioned. Each of these load cells constitutes a thrust measuring load cell and is positioned with its load sensitive axis extending vertically such that the platform 22 is wholly supported in a vertical direction by the load cells.

Each of the thrust measuring load cells 23 has lower and upper end contact surfaces of convex configuration, the radius of curvature of each being less than one-half the vertical distance between the rigid plate 21 and platform 22 so that the desired cancellation of the positive coefficient of restitution by the generation of a negative coefficient of restitution takes place under large loads as described in conjunction with FIG. 3.

A universal flexure 24 in turn is disposed at the center of the platform for connection to the nose of the rocket engine 20 such that all thrust force is transmitted to the platform through this universal flexure.

The measuring system is completed by additional load cells which, in FIG. 4, take the form of lower and upper side force measuring load cells 25 and 26 having horizontal measuring axes lying respectively in lower and upper horizontal planes normal to the vertical thrust axis A, the cell axes intercepting the vertical thrust axis at right angles. The additional cell means also include pairs of lower and upper roll indicating load cells shown at 27, 28 and 29, 30. These pairs of load cells lie respectively in the lower and upper horizontal planes including the side load cells 25 and 26 and are connected such that the axes of the load cells making up each pair pass substantially tangentially to diametrically opposite points of the lower and upper portions of the platform and engine respectively. These latter axes are normal to the axis of the lower and upper side force load cells respectively.

Figure 5:
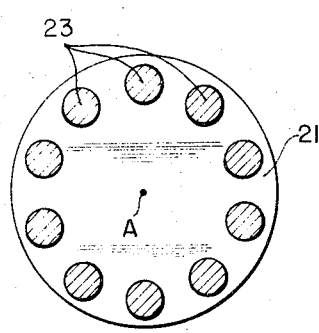
FIG. 5 is a cross-section taken in the direction of the arrows 5—5 of FIG. 4.
Figure 6:
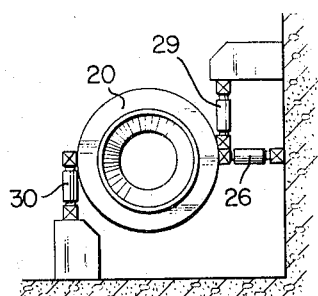
FIG. 6 is a plan view on a reduced scale taken in the direction of the arrows 6—6 of FIG. 4; and, FIG. 7 is another plan view illustrating a modification of the multi cell system of FIG. 4.

The foregoing arrangement of the various load cells will be better understood by referring to FIGS. 5 and 6. In FIG. 5, it will be noted that the plurality of thrust load cells 23 are symmetrically horizontally spaced from the thrust axis A of the rocket 20. In an actual embodiment, there might be provided ten such cells although stability will be provided with three such cells symmetrically spaced relative to the thrust axis. The sum of the cell readings provides the thrust force.

FIG. 6 shows the configuration of the additional load cells wherein it will be evident that side forces can be measured by the side load cell 26 and roll moments computed from the roll load cells 29 and 30. The corresponding lower sets of additional load cells will enable further computations of pitch and yaw forces to be made by comparing the various readings between the lower and upper roll load cells.

Figure 7:
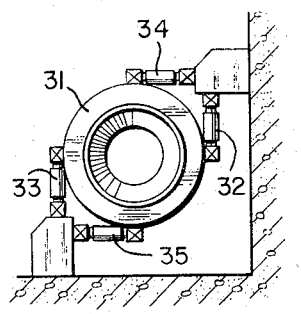

FIG. 7 shows a modified arrangement for the additional load cells wherein there are provided lower and upper sets of four load cells each, the axes of each of the four cells in each set lying in lower and upper horizontal planes respectively. These four axes in each set are further respectively tangential to and connected at 90° circumferentially spaced points on the periphery of the platform and upper portion of the engine. From the orientation of the load sensitive axes of the cells and the respective readings obtainable in each of the lower and upper sets, proper computations of roll, yaw, and pitch forces can be made.

From the foregoing description, it will be evident that the present invention provides a system for measuring extremely large force vectors in which interaction terms are substantially cancelled as a consequence of the unique design of the thrust measuring load cells in conjunction with the opposed bearing surfaces. The invention enables a substantial reduction in overall cost as well as a considerable reduction in the time taken for thrust measurements, overall testing, and data reduction. The elimination of interaction terms enables the determination of a large thrust vector with a high degree of accuracy.

What is claimed is:

1. A low interaction multiple-load cell system for measuring the thrust of a large rocket engine including, in combination:
    a. a rigid flat plate defining on its top a flat horizontal lower bearing surface;
    b. a platform defining on its underside a flat horizontal upper bearing surface;
    c. a plurality of thrust measuring load cells vertically positioned between said lower and upper bearing surfaces such that said platform is wholly supported in a vertical direction by said load cells, each of said thrust measuring load cells having lower and upper end contact surfaces of convex configuration, the radius of curvature of each convex surface being between one-half and one-fourth the vertical distance between said lower and upper end contact surfaces so that a negative coefficient of restitution of horizontal movement of said platform relative to said rigid plate is established which effectively cancels the positive coefficient of restitution resulting from deformation of the bearing surfaces by the end surfaces of the load cells when subjected to a high downward force on the platform;
    d. a universal flexure disposed at the center of the platform for connection to the nose of the rocket engine to be tested so that all thrust force is transmitted to said platform through said universal flexure; and,
    e. additional load cell means having their axes lying in horizontal planes for connection between said platform and a rigid structure adjacent the nose portion of the engine and between the upper tail portion of the engine and a rigid structure adjacent thereto for enabling measurements of side and roll forces generated by said engine to be computed.

2. A system according to claim 1 in which said thrust measuring load cells between the lower and upper bearing surfaces are horizontally symmetrically spaced relative to the vertical thrust axis of the engine to be tested.

3. A system according to claim 1, in which said additional load cell means comprise lower and upper side load cells having horizontal measuring axes lying respectively in lower and upper horizontal planes normal to the thrust axis and intercepting said vertical thrust axis at right angles, and pairs of lower and upper roll indicating load cells lying in said lower and upper horizontal planes respectively and connected with the axes of the load cells making up each pair passing substantially tangentially to diametrically opposite points of the lower and upper portions of the platform and engine respectively, said axes being normal to the axes of the lower and upper side force load cells respectively.

4. A system according to claim 1, in which said additional load cell means comprise lower and upper sets of four load cells each, the axes of the load cells lying in lower and upper horizontal planes respectively, the four axes in each set being respectively tangential to 90° circumferentially spaced points on the periphery of the platform and upper portion of the engine.

* * * * *